United States Patent
Damm

(10) Patent No.: US 10,866,953 B2
(45) Date of Patent: Dec. 15, 2020

(54) INTELLIGENT CACHING FOR ENTERPRISE RESOURCE PLANNING REPORTING

(71) Applicant: InsightSoftware.com International, Bray (IE)

(72) Inventor: Andreas Damm, Denver, CO (US)

(73) Assignee: InsightSoftware.com International, Bray (IE)

(*) Notice: Subject to any disclaimer, the term of this patent is extended or adjusted under 35 U.S.C. 154(b) by 0 days.

(21) Appl. No.: 15/225,871

(22) Filed: Aug. 2, 2016

(65) Prior Publication Data
US 2016/0342650 A1 Nov. 24, 2016

Related U.S. Application Data

(63) Continuation of application No. 14/530,318, filed on Oct. 31, 2014.

(51) Int. Cl.
| G06F 17/30 | (2006.01) |
| G06F 16/2453 | (2019.01) |
| H04L 29/08 | (2006.01) |
| G06F 16/9535 | (2019.01) |
| G06F 16/2455 | (2019.01) |

(52) U.S. Cl.
CPC .. *G06F 16/24539* (2019.01); *G06F 16/24552* (2019.01); *G06F 16/9535* (2019.01); *H04L 67/2842* (2013.01)

(58) Field of Classification Search
CPC .......... G06F 17/3048; G06F 17/30457; G06F 16/168; G06F 16/26; G06F 3/014; G06F 3/016
See application file for complete search history.

(56) References Cited

U.S. PATENT DOCUMENTS 5,995,972 A 11/1999 Allgeier
6,609,126 B1* 8/2003 Smith ............... G06F 17/30433
(Continued)

FOREIGN PATENT DOCUMENTS

EP 1492024 A1 12/2004

OTHER PUBLICATIONS

Bartlett, William P., "Office Action re U.S. Appl. No. 14/530,318", dated Nov. 2, 2016, p. 42, Published in: US.

*Primary Examiner* — Usmaan Saeed
*Assistant Examiner* — William P Bartlett
(74) *Attorney, Agent, or Firm* — Neugeboren O'Dowd PC

(57) ABSTRACT

This disclosure describes systems, methods, and apparatus for ERP reporting using a cache server to cache previous query results. Query latency is further reduced by routing queries and responses to queries through the cache server rather than via direct communication between a querying device and a server hosting the database. This is done by moving a driver for interfacing with the database to the server hosting the database, thus avoiding slow protocol communications between this driver and the database when such communications occur over a WAN. A custom driver is also designed to interface with the cache server and control routing of queries and responses through the cache server. Further, a cache server is selected that enables queries to be passed straight to the server hosting the database rather than the query device having to pass these queries to the database.

17 Claims, 9 Drawing Sheets

(56) References Cited

U.S. PATENT DOCUMENTS

| | | | |
|---|---|---|---|
| 7,398,304 B2 | 7/2008 | Smith et al. | |
| 7,636,740 B2 | 12/2009 | Lee et al. | |
| 7,945,577 B2 | 5/2011 | Altinel et al. | |
| 10,324,952 B1* | 6/2019 | McWherter | G06F 16/86 |
| 2002/0107835 A1* | 8/2002 | Coram | G06F 17/30457 |
| 2002/0116457 A1* | 8/2002 | Eshleman | H04L 29/06 |
| | | | 709/203 |
| 2002/0198883 A1* | 12/2002 | Nishizawa | G06F 17/30902 |
| 2003/0220941 A1* | 11/2003 | Arnold | G06F 16/2453 |
| 2006/0053164 A1* | 3/2006 | Ewing | G06F 17/30306 |
| 2006/0271557 A1* | 11/2006 | Harward | G06F 9/52 |
| 2010/0180208 A1* | 7/2010 | Kasten | G06F 12/0873 |
| | | | 715/745 |
| 2011/0145839 A1* | 6/2011 | Schade | G06F 16/245 |
| | | | 719/321 |
| 2014/0173018 A1* | 6/2014 | Westphal | H04L 41/0823 |
| | | | 709/213 |

\* cited by examiner

INTELLIGENT CACHING FOR ENTERPRISE RESOURCE PLANNING REPORTING

CLAIM OF PRIORITY UNDER 35 U.S.C. § 120

The present application for patent claims priority to U.S. patent application Ser. No. 14/530,318, published as U.S. Publication No. 2016/0125029, and entitled "INTELLIGENT CACHING FOR ENTERPRISE RESOURCE PLANNING REPORTING" filed Oct. 31, 2014, and assigned to the assignee hereof and hereby expressly incorporated by reference herein.

FIELD OF THE DISCLOSURE

The present disclosure relates generally to database reporting. In particular, but not by way of limitation, the present disclosure relates to systems, methods and apparatuses for caching of query results from database queries.

BACKGROUND

Many organizations store financial data, manufacturing data and other critical data in databases or other electronic storage formats. Enterprise resource planning (ERP) is business management software that companies use to collect, store, manage, and interpret this data. Today, Oracle is the largest ERP provider and sells multiple ERP solutions including Oracle Fusion, JD Edwards PeopleSoft, and JD Edwards EnterpriseOne, to name just three examples.

For purposes of understanding the data, the data must be reported in some form that makes sense to human or programmatic users. In other words, users typically want to see quantitative information "by" some criteria. For example, a user may want to see sales in dollars by month, by cost center, by region and so on.

While ERP software effectively collects and manages data, viewing that data can be cumbersome with existing ERP reporting tools. Many companies compete in the ERP reporting space, and Oracle has even purchased Hyperion in order to improve its own reporting capabilities as well as developed its own reporting tool—JD Edwards EnterpriseOne One View Reporting.

As ERP reporting tools move to the cloud, customers continue to expect faster and faster response times for database queries.

SUMMARY OF THE DISCLOSURE

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

This disclosure describes systems, methods, and apparatus for ERP reporting using a cache server to cache previous query results. Query latency is further reduced by routing queries and responses to queries through the cache server rather than via direct communication between a querying device and a server hosting the database. This is done by moving a driver for interfacing with the database to the server hosting the database, thus avoiding slow protocol communications between this driver and the database when such communications occur over a WAN. A custom driver is also designed to interface with the cache server and control routing of queries and responses through the cache server. Further, a cache server is selected that enables queries to be passed straight to the server hosting the database rather than the query device having to pass these queries to the database.

Some embodiments of the disclosure may be characterized as a database reporting system configured to communicate with a database via a cache server. The system can include a query application server and a database server. The query application server can be configured to couple to a cache server via a local area network. The database server can be configured to receive a query from the cache server when a query result for the query is not found in the cache server. The database server can be further configured to return the query result to the cache server. The database server can include a database, a query server, and one or more network connections. The database server can make the query to the database when the query result is not found in the cache server. The query server can have a database-specific driver configured to make the query to the database and receive the query result from the database. The query server can be configured to pass the query result back to the query application server via the cache server. The query server can be further configured to cache the query result in the cache server. The one or more network connections can be configured for coupling to the cache server and can be configured to pass the query from the cache server to the query server. The one or more network connections can be further configured to pass the query result from the query server to the cache server.

Other embodiments of the disclosure may also be characterized as a database reporting system configured to communicate with a database via a cache server. The system can include a query application server and a database server. The query application server can be configured to couple to a cache server. The database server can include a database, a query server, a database-specific driver specific to the database, and first and second network interfaces. The first network interface can be configured to enable a first network connection between the database server and the cache server. The first network interface can be configured to receive queries from the cache server and to return query results to the cache server for caching. The second network interface can be configured to enable a second network connection between the database server and the query application. The second network interface can be configured to return the query results to the query application server via the cache server.

Other embodiments of the disclosure can be characterized as a method for operating a database reporting system where queries and query results pass through a cache server. The method can include passing a query from a query application server to a cache server. The method can further include receiving an indication that the cache server does not have a query result for the query. The method can further include instruction the cache server to pass the query to a query server of a database server. The method can yet further include querying a database of the database server. The method yet further can include receiving a query result from the database. Lastly the method can include passing the query result to the query application server via the cache server and also caching the query result in the cache server.

BRIEF DESCRIPTION OF THE DRAWINGS

Various objects and advantages and a more complete understanding of the present invention are apparent and more readily appreciated by referring to the following detailed description and to the appended claims when taken in conjunction with the accompanying drawings:

DETAILED DESCRIPTION

The word "exemplary" is used herein to mean "serving as an example, instance, or illustration." Any embodiment described herein as "exemplary" is not necessarily to be construed as preferred or advantageous over other embodiments.

For the purposes of this disclosure, "dependencies" are relations between a query result and one or more tables in the database from which that query result is drawn.

For the purposes of this disclosure, "query results" means data that is returned in response to a query and in either a raw or transformed state (e.g., filtered, summed, categorized, etc.).

For the purposes of this disclosure, a "driver" means a software, hardware, or firmware adaptor module or modules, or some combination of these, that converts queries and other communications and instructions to a protocol that can be communicated to and understood by at least a database or cache server.

ERP reporting systems can operate slower than expected by modern users because of the need to make repeated queries to a database and transform the raw data into query results (e.g., summing, filtering, categorizing, etc.). Databases are in part designed for performing these data transformation functions and not necessarily for speed. Similarly, the time required to perform these transformations is not insignificant.

One way to overcome this problem is to cache query results so that they can be more quickly accessed via subsequent queries. Caching involves storing query results in a storage device (e.g., a cache server) that is tailored for rapid responses to data lookup. A cache server can be tailored for speed, as compared to a database server, which must have more general and slower functionality. This is because database servers are called on to perform more general functions than mere data lookup. Database servers are called on to not only lookup data in a database, but then transform the data according to a user preference (e.g., reporting parameters) and perform calculations on the data to be presented in a report. For instance, a query may ask for a total of sales in a Western region for a national retailer, thus requiring a database server to calculate this total before sending the result back to a query device. Since a cache server does not need to perform calculations and transformations of data in response to a query, it can be optimized to return query results faster than a database server. Hence, use of a cache server improves the user experience since queries can often be addressed via query to the cache server, a much faster process than querying the database.

Figure 1:
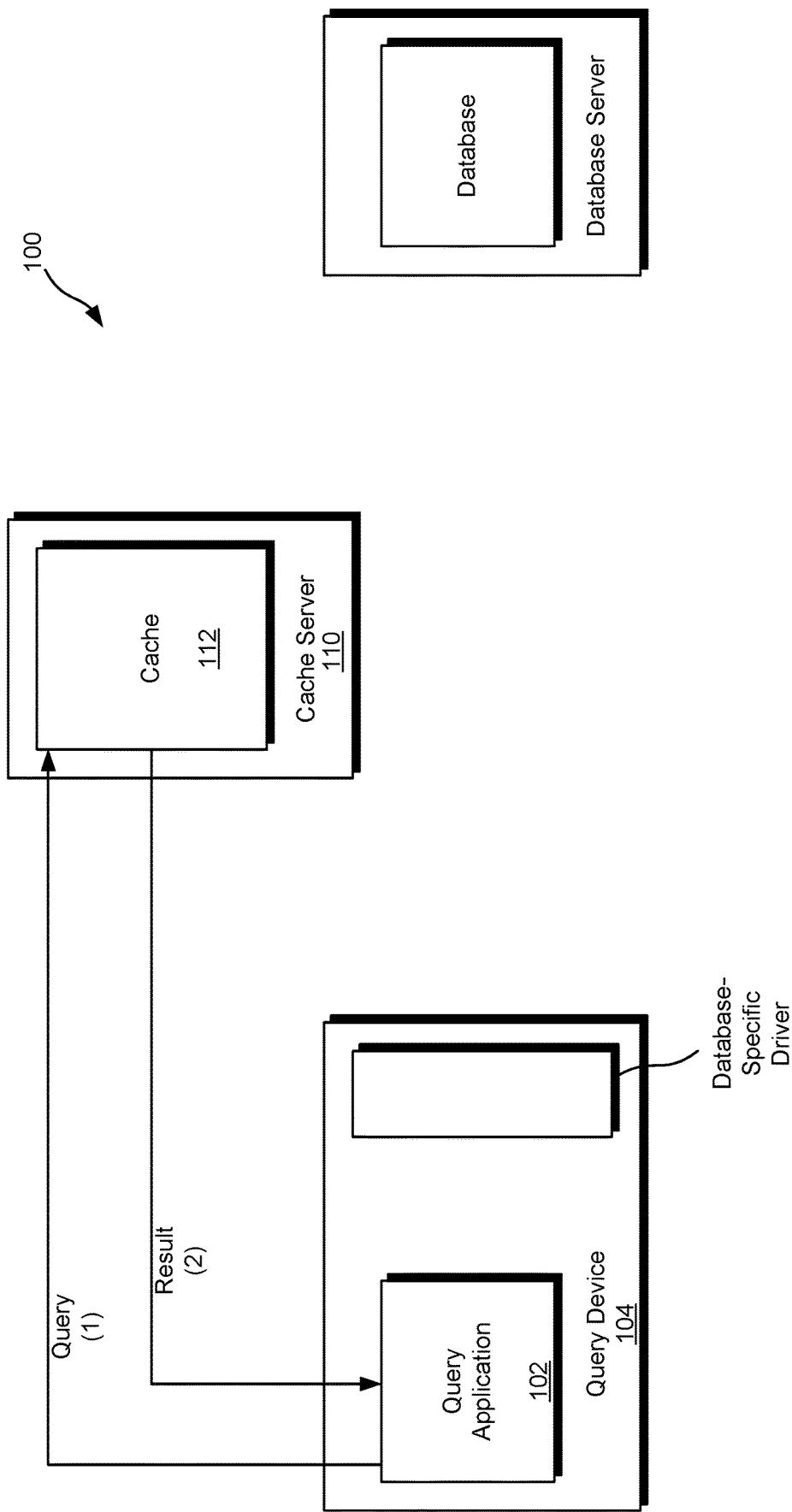
FIG. 1 illustrates a system using a cache server to improve the speed of an ERP reporting tool.
Figure 2:
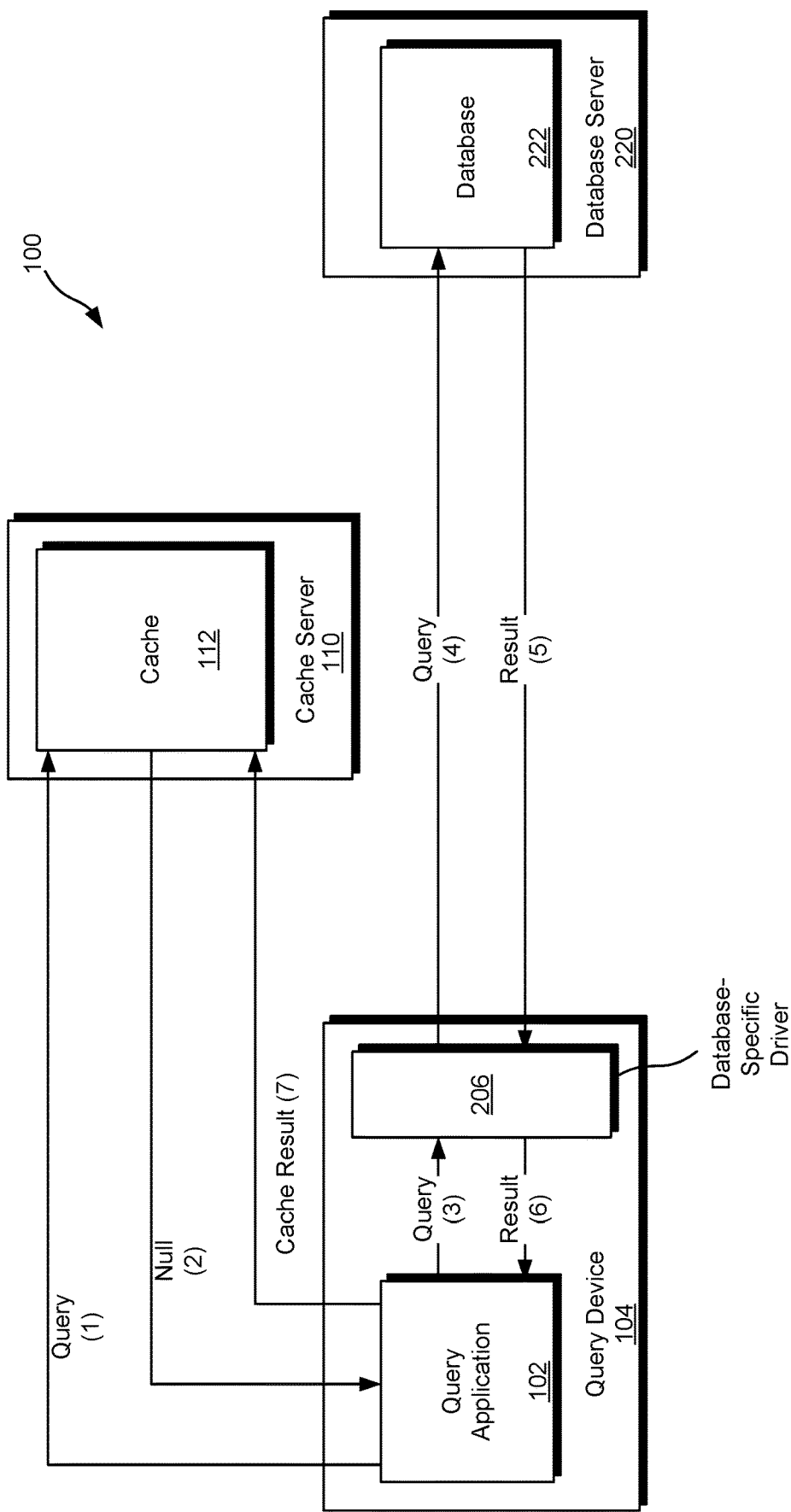
FIG. 2 illustrates the system of FIG. 1 where the cache server cannot find the query result in the cache.

FIGS. 1 and 2 illustrate a system using a cache server to improve the speed of an ERP reporting tool. A user enters a query into a query application 102 running on a query device 104 (e.g., a tablet or desktop computer). The query application 102 is configured to pass the query to the cache server 110 which searches its cache 112 for a query result to the query. If a query result is in the cache 112, then the cache server 110 returns the query result to the query application 102, which can display the query result to the user.

FIG. 2 illustrates operation of the system 100 where the cache server 110 cannot find the query result in the cache 112 (1). When this is the case, the cache server 110 returns a null or some other indication that the query result cannot be found in the cache 112 (2). The query application 102 then passes the query to a database server 220. A driver is used to interface the query application 102 to the database server 220, and can be referred to as a database-specific driver 206 since the driver is configured or designed to interface with a specific database. For instance, a database 222 often is installed on a database server 220 along with a database-specific driver 206 installed on client devices (those devices planning to access the database server 220). The database-specific driver 206 prepares the query for transport over a connection between the query device 104 and the database server 220. For instance, such a connection can be a wide area connection (WAN) such as a secure connection over the Internet. The query is passed to the database-specific driver 206 (3) and then passed to the database server 220 (4). The database server 220 makes the query to the database 222, prepares the query result (e.g., calculations and formatting), and returns a query result to the database-specific driver 206 (5). The database-specific driver 206 then returns the query result to the query application 102, which can display the query result to the user.

While caching has significantly improved the speed of queries, implementing a cache server and caching functionality typically requires modification to the query application 102. Modifying application code can introduce bugs and complexities that slow the query application 102. Therefore, there is a need for systems and methods that enable caching functionality without requiring modification to the query application 102.

Another factor slowing ERP reporting systems is a customer desire to retain control over the physical location of the database. In other words, customers prefer the database 222 to reside on their premises. For instance, where a customer has confidential data in the database 222 (e.g., medical providers, insurance companies, government agencies, and others having large amounts of confidential data) there is reluctance to store this confidential information in the cloud, even though cloud-based databases can improve the speed of ERP reporting tools. This is because queries performed to a database that remains on a customer's premises often must traverse a wide area network (WAN) and this can entail communication protocols that are 'chatty'—requiring numerous transmissions back and forth between the query device and the database for every query. Customer reluctance to move data into the cloud has created a need for an ERP reporting solution that allows customers to retain the database 222 on their premises while also providing the speed of a system with a cloud-based database 222.

Additionally, modifying a typical ERP reporting tool to implement caching typically requires changes to a query application—changes at the application layers. This can introduce bugs in the code and complexities to the system that deteriorate the user experience or greatly add to the cost of developing reporting tool. There is therefore a need for a way to implement caching without modifying the application layer.

The inventor recognized that ERP reporting tools using caching could meet the above-noted desires by (1) moving the database-specific driver to the database server, (2) routing all queries and query results through the cache server thus avoiding direct communication between the query device and the database server, and (3) implementing caching functionality at the driver layer rather than the application layer (e.g., via implementation of a custom driver designed to interface the query application to the cache server). Locating the database-specific driver on the database server and routing queries and query results through the cache server avoids a WAN connection between the database-specific driver and the database and thereby greatly reduces the latency of queries to the database. These changes to a traditional non-caching ERP reporting system can be implemented at the driver layer by creating a custom driver (or cache server interfacing driver) that can be loaded with a query application and used to interface with the cache server and control caching. This prevents the need to modify the query application or any other components at the application layer, and thereby avoids complications to the development cycle.

Routing all queries and query results through the cache server can require a slightly more intelligent cache server than is typical—but only in that the cache server should have the added functionality of being able to publish communications to other than the querying device (e.g., the ability to pass queries to and receive query results from the database server via a network connection). Such added functionality typically does not cause perceptible loss of speed in a cache server. Further, since the database-specific driver cannot receive network traffic, it can be used within a query server on the database server, such that the query server interfaces the database-specific driver to network connections to the cache server.

Figure 3:
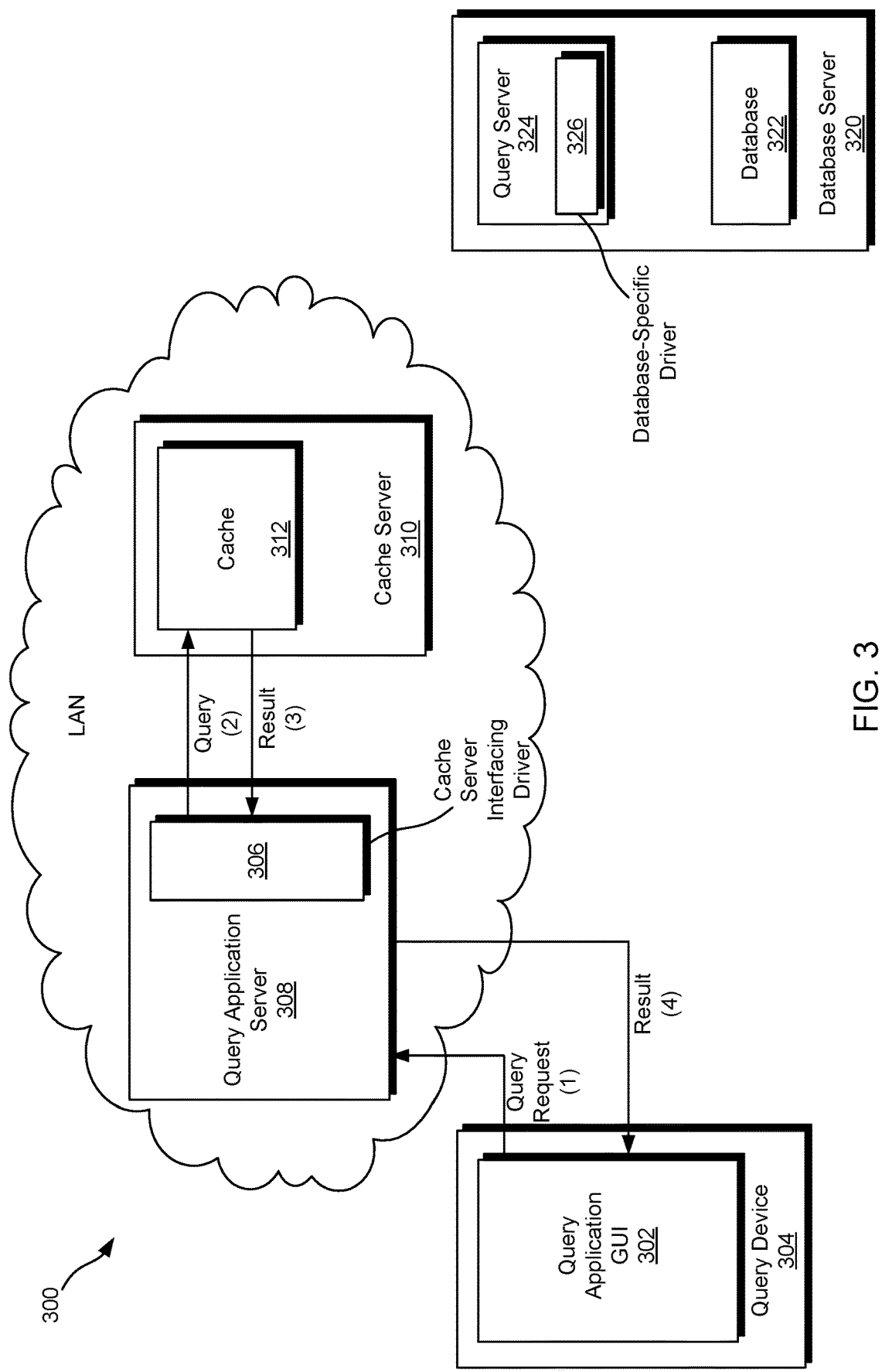
FIG. 3 illustrates an ERP reporting tool according to one embodiment of this disclosure.
Figure 4:
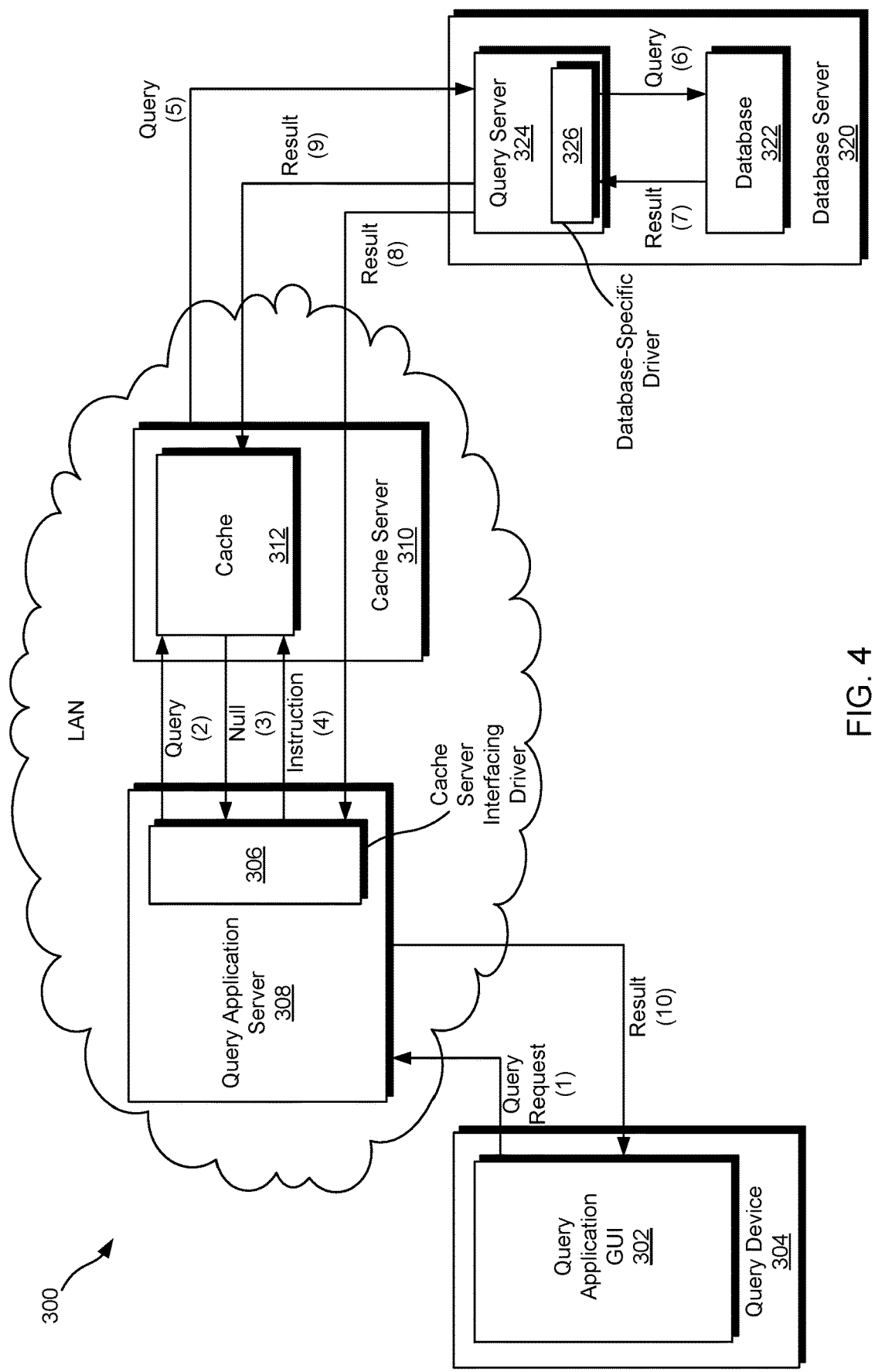
FIG. 4 illustrates the ERP reporting tool of FIG. 3 where the cache server cannot find the query result in the cache.

FIGS. 3 and 4 illustrate an embodiment of an ERP reporting system having a database-specific driver on a database server and a cache server interfacing driver on a query application server, and that routes queries and query results through a cache server. The system 300 includes a query application that can have a graphical user interface portion and a server portion. In particular, a query application graphical user interface 302 (GUI) can reside on a query device 304 (e.g., laptop computer, ultrabook, desktop computer, tablet computer, or smartphone, to name a few non-limiting examples) and can be coupled to a query application server 308 (e.g., in the Cloud). The query application server can include a cache server interfacing driver 306 that is designed for the system 300 and can interface with (or be configured to interface with) a cache server 310. By using the cache server interfacing driver 306, the query application server 308 communicates with the cache server 310 at the driver layer rather than at the application layer.

The cache server 310 can include a cache 312. The query application server 308 and the cache server 310 can be part of a local area network (LAN) such that a connection between the cache server interfacing driver 306 and the cache server 310 is via LAN connection. Because of this LAN connection, queries to the cache server 310 can be carried out very quickly. Where a query result cannot be found on the cache server, a database server 320 holds a database 322 and a query server 324, where the query server 324 includes a database-specific driver 326. The database-specific driver 326 can make queries to the database 322 and receive query results from the database 322.

FIG. 3 as compared to FIG. 4 illustrates operation of the system 300 where a query result can be found in the cache 312. A user can initiate a query request, for instance via the query application GUI 302. The query device 304 passes the query request to the query application server 308 (1). The cache server interfacing driver 306 prepares the query request for transmission to the cache server 310 and passes the query to the cache server 310 (2) (e.g., via a LAN connection). The cache server 310 searches the cache 312 to see if a query result to the query exists in the cache 312 (e.g., has been previously made and cached). If a query result is found in the cache 312, then the cache server 310 returns the query result to the cache server interfacing driver 306 (3) and the query application server 308 passes the query result from the cache server interfacing driver 306 to the query device 304 (4). The query device 304 makes the query result available to the query application GUI 302, which can then display the query result for the user. In this situation, the cached query result is returned with very low latency since the database 322 does not need to be queried.

FIG. 4 illustrates operation of the system 300 where a query result is not cached. A user can initiate a query request, for instance via the query application GUI 302. The query device 304 passes the query request to the query application server 308 (1). The cache server interfacing driver 306 prepares the query request for transmission to the cache server 310 and passes the query to the cache server 310 (2) (e.g., via a LAN connection). The cache server 310 searches the cache 312 to see if a query result to the query exists in the cache 312 (e.g., has been previously made and cached). If a query result is not found in the cache 312, then the cache server 310 returns an indication (e.g., a null or no result value) to the cache server interfacing driver 306 (3). In response, the cache server interfacing driver 306 instructs the cache server 310 (4) to pass the query to the database server 320 (5). The query server 324 can receive the query, and the database-specific driver 326 can make the query to the database 322 (6). The database 322 returns a query result to the database-specific driver 326 (7). The query server 324 can then return the query result to the query application server 308 via the cache server 310 (which has the ability to pass on communications) (8), and also instruct the cache server 310 to store the query result in the cache 312 (9). Although the query results is illustrated as being returned to the cache server 310 via two separate paths (8 and 9), this is illustrative only, and in other embodiments, a single communication path can carry the query result to the cache server 310 for caching and also return the query result to the query application server 308. The cache server 310 can cache the query result and pass the query result to the query application server 308. The cache server interfacing driver 306 can receive the query result from the cache server 310 (e.g., via a LAN connection) and provide the query result to the query application server 308. Finally, the query application server 308 can pass the query result to the query device 304 (10), which can provide the query result to the query application GUI 302, which displays the query result to the user.

The cache server interfacing driver 306 is a custom driver configured to load with the query application. In the illustrated embodiment, this means loading with and operating on the query application server 308. In another instance this means loading with a query application that fully resides on the query device 304 rather than being distributed. Wherever the cache server interfacing driver 306 is arranged, it is configured to interface over a network connection (e.g., a LAN connection) with the cache server 310. This network connection can be designed to use a protocol that is much faster than the one that the database-specific driver 206 uses to pass queries to and receive query results from the database server 220 (see FIG. 2). Additionally, the cache server 310 and the database server 320 can communicate via a WAN, but this network connection can be designed to use a protocol that is also much faster than the one that the database-specific driver 206 (see FIG. 2) uses to pass queries to and receive query results from the database server 220. As a result, routing queries and query results through the cache server 310 and avoiding direct communication between the query device 304 and the database server 320 greatly improves the speed of queries to the database 322.

The cache 312 can be a portion or all of a memory of the cache server 310. The cache 312 can store query results, dependency mappings, and dependency tables for a dynamic period of time, where the query results and dependency mappings can be invalidated after a change to a related table in the database 322 has occurred. The cache server 310 has the ability to communicate with other devices, such as the database server 320, and this ability allows it to pass or publish the query to the query server 324 of the database server 320.

The cache server 310 can be part of an independent hardware component or can be a sub-component of a larger hardware device hosting multiple servers. Alternatively, the cache server 310 can be distributed amongst multiple server devices. Many cloud-based server systems can host a cache server 310. The cache server 310 can reside in the Cloud and can be separate from or controlled apart from the system 300. For instance, AMAZON WEB SERVICES and other cloud based services can provide the cache server 310, and the system 300 can interface with AMAZON'S cache server or cache server(s). In one non-limiting example, the cache server 310 can be implemented with the REDIS cache server.

The query device 304 can be any computing device having sufficient logic, display, and input components to display outputs of the query application for a user and receive inputs from the user for controlling the query application, and sufficient communication components to pass queries to the query application server 308 and receive query results from the query application server 308. For instance, the query device 304 can include a mobile phone, smartphone, smart article of clothing (or accessory), tablet computer, desktop computer, embedded device, or ultrabook, to name just a few non-limiting examples. The query device 304 can take on different forms and comprise further functionality when the query application resides entirely on the query device 304 rather than being distributed between the query device 304 and the query application server 308.

The query application server 308 can be part of an independent hardware component or can be a sub-component of a larger hardware device hosting multiple servers. Alternatively, the query application server 308 can be distributed amongst multiple server devices.

When the query server 324 obtains query results from the database 322, it can also obtain dependency information. Dependencies can include data indicating relationships between query results and tables of data where the query results were created from and/or other tables including data that depends from the data in the query results or that the query results depend on. The dependencies can be stored by the cache server 310 and can be used to perform dynamic invalidation of stale query results in the cache 312 as will be discussed in depth in a later section.

The database server 320 can be remote from the cache server 310 and the query application server 308. In some instances, the cache server 310 and the database server 320 can be coupled via a wide area network (WAN) such as the Internet. In an embodiment, the database server 320 can be arranged on or within a customer's premises (e.g., within a headquarters building or within a server farm close to or closely controlled by a customer), where a customer is the entity owning and operating an instance of the ERP and ERP reporting system(s). The database server 320 has the ability to manipulate the database 322 and handle queries from the query server 324 (e.g., via the database specific driver 326). For instance, the database server 320 can perform calculations on data in the database in response to a query. The query results that are prepared in response to a query from the query server 324 can also be transformed to suit parameters of the query (e.g., filtering, sorting, summing). For instance, sorting, filtering, and summarizing data in the database 322, to name three non-limiting examples, can be performed so as to return the data in a different form to the query server 324. The database server 320 can host the database 322 and the query server 324. The database server 320 can be remote from the query device 304 and the cache server 310.

The query application server 308 may include one or more applications at an application layer, one or more drivers at a driver layer, and one or more hardware subcomponents at a hardware layer. The one or more drivers (e.g., cache server interfacing driver 306) can interface data and commands between the application and hardware layers.

A query application can be considered as a distributed entity comprising the query application server 308 and the query application GUI 302. The cache server interfacing driver 306 can enable the query application to partake in a caching scheme where the query application does not have any coded caching functionality. In other words, caching of query results can be implemented without making changes to the query application. All coding changes or additions to enable the herein disclosed caching can be made at the driver layer—via writing and operation of the cache server interfacing driver 306. Further, the cache server interfacing driver 306 can be configured to instruct the cache server 310 to publish queries to the query server 324 when a query result is not found in the cache 312.

The query application can be installed on the query device 304 or can be a web-based application hosted on a remote server (e.g., the query application server 308) and with little to no components installed on the query device 304 (e.g., only a GUI installed on the query device 304). The query application can take the form of any ERP reporting software such as INSIGHTSOFTWARE's INSIGHTUNLIMITED or HUBBLE. The query application can be configured to pass queries and receive query results and further to display those query results on a display component of the query device 304 for a user. The query application can receive inputs from a user indicating query parameters. For instance, a user can ask for a certain type of data from a subset of data in the database 322 and can request that the query results be presented in a certain format and/or with certain calculations performed on the returned raw data. The query application 302 can operate according to instructions stored in a non-transitory, tangible computer-readable storage medium of the query device 304 or memory of a remote server (in the case of a web-based application) or according to instructions embodied in programmable logic of one or more logic circuits (e.g., analog logic or an Application-Specific Integrated Circuit). In the illustrated embodiment, the above-noted functionality of the query application can be distributed between the query application GUI 302 and the query application server 308.

A server, (e.g., the query application server, cache server, query server, database server) can be distributed between multiple hardware devices (e.g., a server farm), although this is not required, and in some cases a server can reside solely on a lone hardware device. In some instances, a server is one or more hardware devices.

The LAN can be a wired or wireless network, or some combination of the two. Each of the query device 304, query application server 308, cache server 310, and database server 320 can include one or more network interfaces for connecting to a LAN or WAN. The query device 304 and the query application server 308 can include one or more network connections between each other, the one or more network connections configured to pass the query request from the query device 304 to the query application server 308 and to pass the query result from the query application server 308 to the query device 304. The query application server 308 and the cache server 310 can include one or more network connections between each other, the one or more network connections configured to pass the query from the query application server to the cache server 310, to pass an indicator from the cache server 310 to the query application server 308, to pass one or more instructions from the query application server 308 to the cache server 310, and to pass the query result from the cache server 310 to the query application server 308 (the query result coming from either the cache 312 of the cache server 310 or from the query server 324). The cache server 310 and the database server 320 can include one or more network connections between each other, the one or more network connections configured to pass the query to the query server 324 and to return the query result to the cache server 310 along with instructions to cache the query result in the cache 312.

Figure 5:
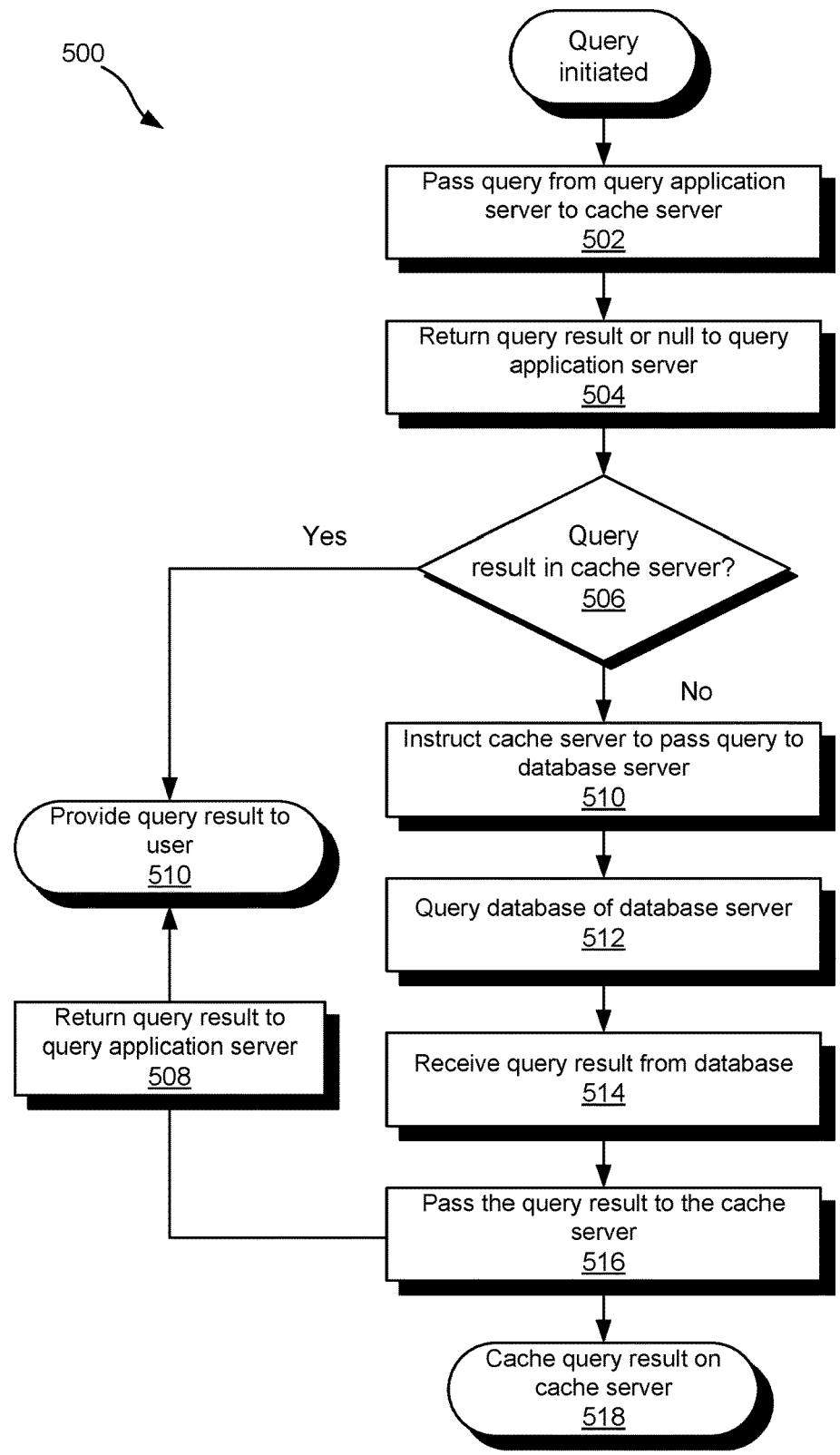
FIG. 5 illustrates a method for database reporting where queries and query results pass through a cache server.

FIG. 5 illustrates a method for database reporting where queries and query results pass through a cache server. The method 500 can begin with initiation of a query, for instance by a user entering a query into an interface of a query application having a query application server, such as query application server 308. In some case the query can be entered into a query application GUI (e.g., query application GUI 302) and passed to a query application server (e.g., query application server 308). Whatever the source of the query, once initiated, the method 500 can pass the query from a query application server (e.g., query application server 308) to a cache server (e.g., cache server 310) (Block 502). Next, a query result or a null (or other indication that the query result cannot be found in the cache) can be returned to the query application server (Block 504) (or alternatively to a query device if the query application resides entirely on the query device). If the query result is returned (i.e., if the query result was returned from the cache or found in the cache) (Decision 506), then the method 500 provides the query result to the user (Block 510) (e.g., by displaying the query result on a GUI such as query application GUI 302). If the query result is not returned (i.e., if the query result was not found in the cache as indicated by a null or some other indicator) (Decision 506), then the method 500 instructs the cache server to pass the query to the database server. In some instances, a query application server (e.g., query application server 308) or a cache server interfacing driver (e.g., cache server interfacing driver 306) can instruct the cache server to pass the query to the database server. In some embodiments, communications between the cache server and the query application server can take place via a fast network connection, such as one over a LAN. The method 500 then queries the database of the database server (Block 512) (e.g., database 322 and database server 320, respectively). The method 500 then receives a query result from the database (Block 514) and passes the query result to the cache server (Block 516). This passing can take place via a WAN where the database server resides on a customer's premises. The method 500 can also return the query result to the query application server (Block 508) and provide the query result to the user (Block 510). The method can also cache the query result on the cache server (Block 518). The Blocks 508 and 518 can take place at the same time, in parallel, or at different or overlapping periods of time. In some cases these two communications can occur via the same network and/or via the same network interface. However, in other cases, these two communications may occur via separate network interfaces and/or separate networks. Caching of the query result on the cache server (Block 518) can be controlled by instruction from a query server such as query server 324.

Figure 6:
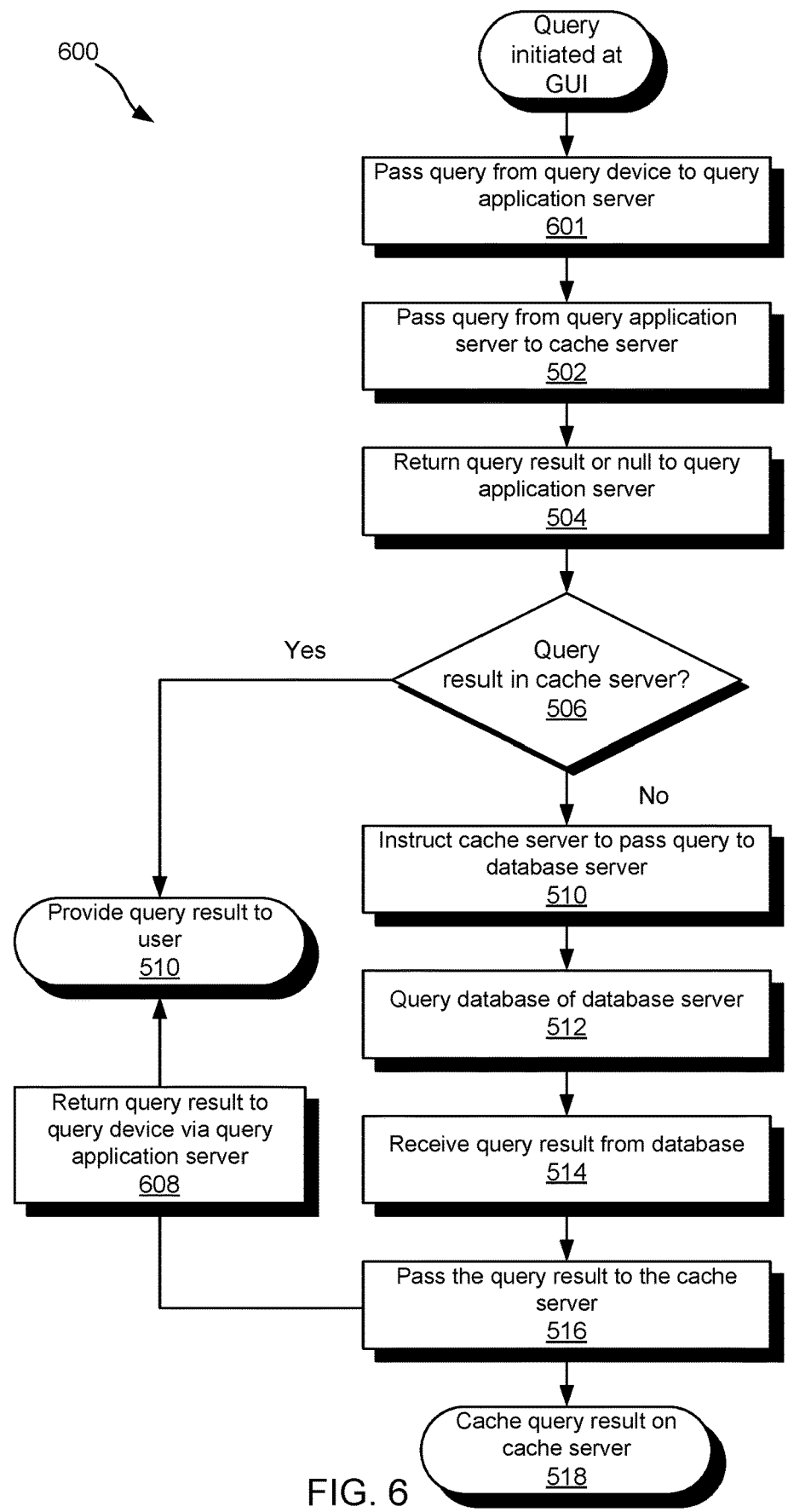
FIG. 6 illustrates a further method for database reporting where queries and query results pass through a cache server.

FIG. 6 illustrates a further method for database reporting where queries and query results pass through a cache server. FIG. 6 differs from FIG. 5 in only a few respects, and therefore the reference numbers from FIG. 5 have been reused where the same operations occur. FIG. 6 assumes that the query is initiated via a query application GUI (e.g., on query application GUI 302) implemented on a query device (e.g., query application 304). The method 600 then passes the query from the query device to a query application server (Block 601). The method 600 then proceeds as described in FIG. 5 until the query result is passed to the cache server (Block 516). Then the query result is again cached (Block 518), but also passed to the query device via the query application server (Block 608).

Figure 7:
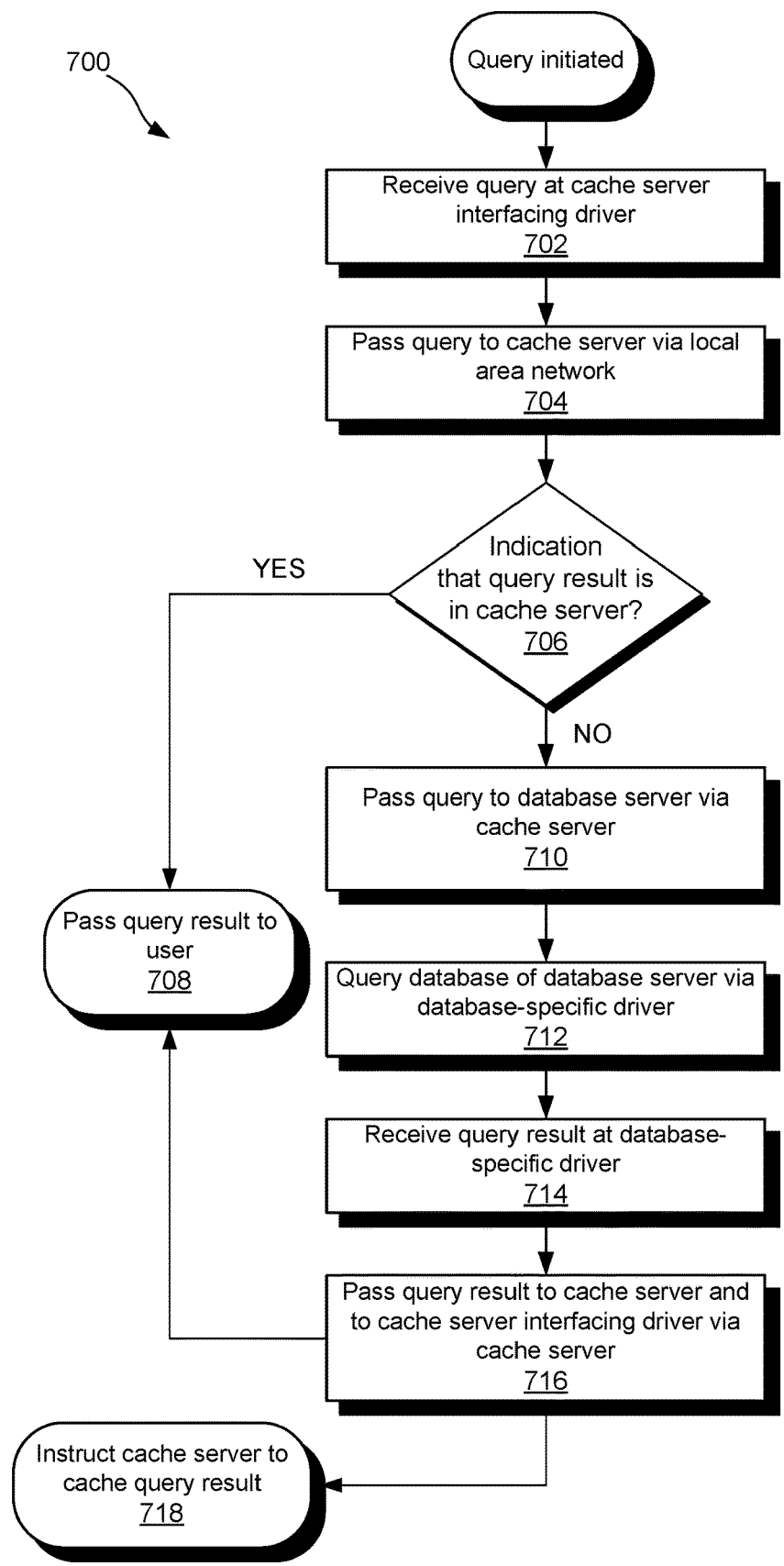
FIG. 7 illustrates yet another method for database reporting where queries and query results pass through a cache server.

FIG. 7 illustrates yet another method for database reporting where queries and query results pass through a cache server. The method 700 begins with initiation of a query (e.g., via user input at a query device, a query application, or a query application GUI, to name a few non-limiting examples). The method 700 then receives the query at a cache server interfacing driver (Block 702) (e.g., cache server interfacing driver 306). For instance, a query application server may receive a query request from a query device and then the cache server interfacing driver prepares to pass a corresponding query to a cache server. The method 700 then passes the query to the cache server via a local area network (Block 704). This can be performed by the cache server interfacing driver which may be configured to interface with the cache server. The cache server can then return an indication as to whether the query result is in the cache server or not, and the method 700 looks to this indicator to determine what to do next (Decision 706). For instance the cache server may return a null or some other indication that tells the query application server that the query result cannot be found on the cache server. If the query result is on the cache server (e.g., if the cache server returns a query result), then the cache server interfacing driver provides the query result to the query application server, which in turn returns the query result to a user via a query device and some form of user interface (Block 708). If an indication is received indicating that the query result is not in the cache server (Decision 706), then the method 700 passes the query to a database server via the cache server (Block 710). For instance, the cache server interfacing driver can instruct the cache server to pass the query to the database server via a wide area network. The method 700 then queries the database of the database server via a database-specific driver (Block 712) (e.g., database-specific driver 326. The database-specific driver then receives a query result in response to the query (Block 714) and passes the query result to the cache server (Block 716). The database-specific driver also passes the query result back to the cache server interfacing driver via the cache server (Block 716). In some instances, the database-specific driver can be implemented in a query server of the database server so that the query server can negotiate network communications to the cache server—a function that the database-specific driver may not be capable of. The method 700 then instructs the cache server to cache the query result (Block 718) (e.g., at the instruction of a query server such as query server 324) and returns the query result to the user (Block 708), for instance via a query application server and an interface of a query device.

Dynamic Invalidation of Stale Cached Query Results

Caching also suffers inefficiencies from the use of a fixed invalidation period. That is, in order to ensure that cached query results do not become stale (where the cached query result no longer matches a query result that would be returned if the query were made to the actual database), typical cache servers invalidate cached query results after a fixed period of time, where the fixed period of time can vary for different types of query results. This means that some query results are invalidated before they become stale while others are invalidated after they have become stale. As seen, the typical invalidation scheme for caching query results is both inefficient and also potentially can return stale query results.

To improve upon the typical caching invalidation scheme, the current disclosure describes a caching scheme where cached query results are invalidated whenever a change in the actual database occurs. In particular, a query server on the database server can monitor the database for changes. Whenever one occurs, the query server can contact the cache server and instruct it to invalidate any query results associated with the changed data in the database.

Typical cached query results have a fixed expiration timer, that when expired, causes the associated query result(s) to expire or be invalidated (e.g., purged). However, since tables in a database can change faster or slower than the fixed expiration timer, invalidation often occurs before the query results become stale or after they become stale.

This disclosure more effectively manages query result invalidation by monitoring changes in the database 322 via the query server 324. When a change occurs, regardless of ongoing queries, the query server 324 informs the cache server 310 about the change and instructs the cache server 310 to modify dependencies that it has stored. In particular, the query server 324 can instruct the cache server 310 to invalidate or remove any query results or tables associated with the changed data in the database 322. In other embodiments, the query server 324 can instruct the cache server 310 to invalidate or remove any query results or tables formed with data that has changed in the database 322 or that depends from data that has changed in the database 322. Keeping track of which query results have dependencies to other query results can be managed via a dependency table of the cache server 310, which stores mappings of query results to each other when a dependency exists. In addition to invalidation of query results as soon as they become stale, the query server 324 can also instruct the cache server 310 to update a dependency list that tracks dependencies for all cached query results. In this way, as soon as cached query results become stale, due to a change in the database 322, those query results are invalidated in the cache 312, and otherwise remain alive indefinitely. This intelligent invalidation scheme prevents early or late invalidation of cached query results.

Figure 8:
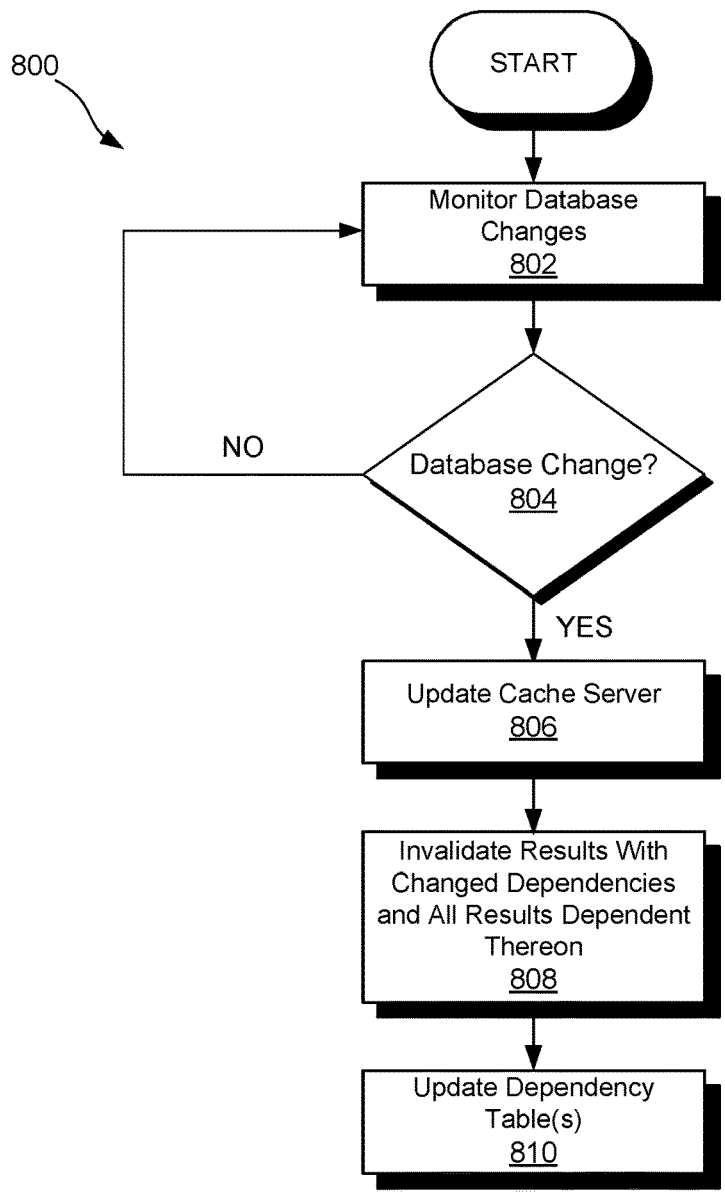
FIG. 8 illustrates a method for dynamic invalidation of cached search results and updating of related dependency tables.

FIG. 8 illustrates a method for dynamic invalidation of cached search results and updating of related dependency tables. The method 800 can begin by monitoring database changes (Block 802). Such monitoring can be performed by a query server such as query server 324. Until a database change is identified (Decision 804), the method 800 can continue to monitor changes in the database (loop between Block 802 and Decision 804). When a database change is identified (Decision 804), the method 800 can update a cache server (Block 806) and invalidate results with changed dependencies and all query results depending from changes in the database (Block 808). For instance, all query results depending from a table in the database that has changed can be invalidated. Along these same lines, the method 800 can also update one or more dependency tables on the cache server (Block 810) to reflect the change(s) in the database. The dependency table(s) may include one or more mappings of cached query results to tables in the database from which those query results were derived. If any of those tables changes, then the mappings to query results that are no longer valid, can be removed.

Figure 9:
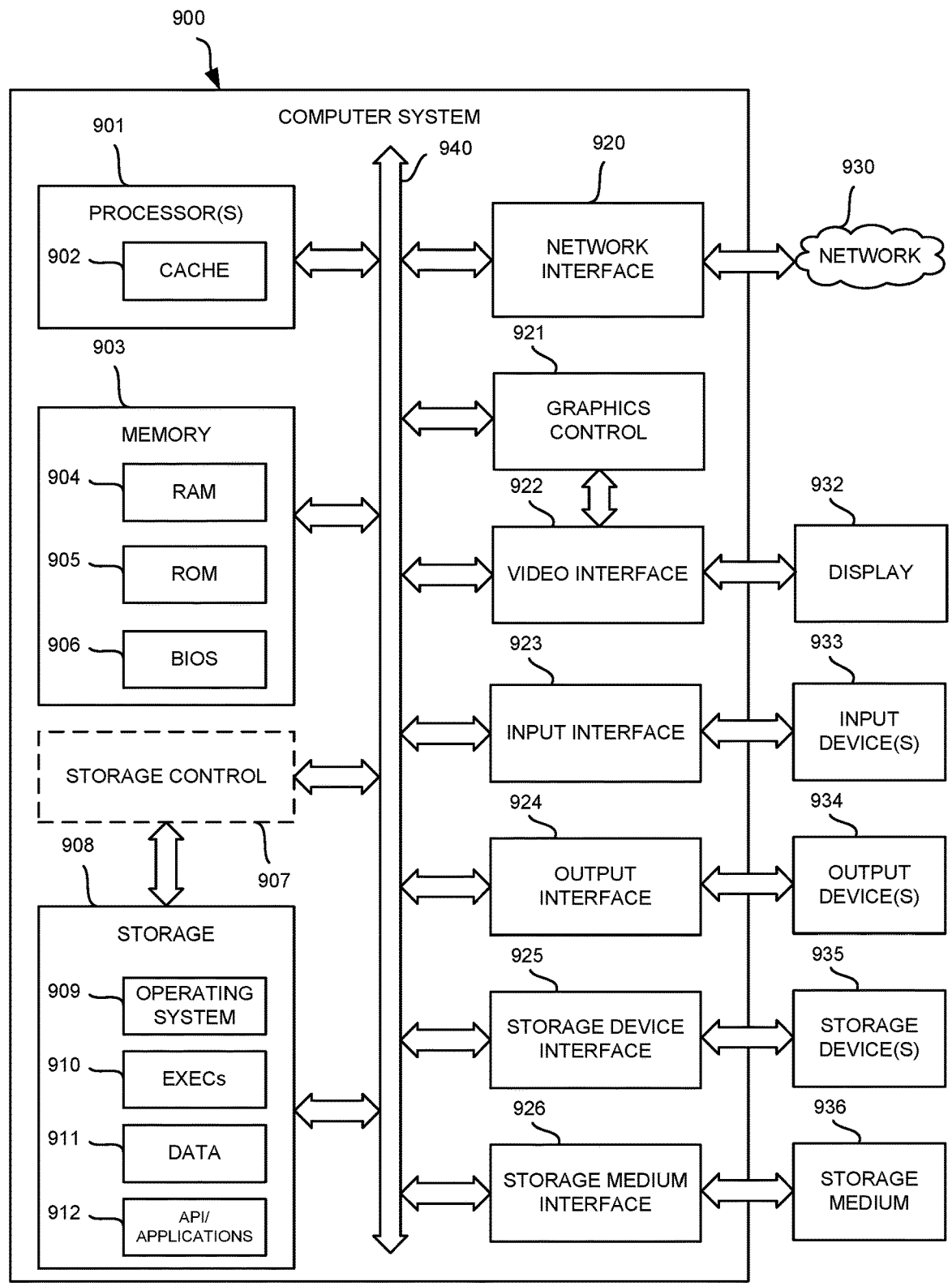
FIG. 9 shows a diagrammatic representation of one embodiment of a computer system within which a set of instructions can execute.

The systems and methods described herein can be implemented in a computer system in addition to the specific physical devices described herein. FIG. 9 shows a diagrammatic representation of one embodiment of a computer system 900 within which a set of instructions can execute for causing a device to perform or execute any one or more of the aspects and/or methodologies of the present disclosure. The query device 304, query application server 308, cache server 310, and database server 320 in FIGS. 3-4 are just some implementations of the computer system 900. The components in FIG. 9 are examples only and do not limit the scope of use or functionality of any hardware, software, firmware, embedded logic component, or a combination of two or more such components implementing particular embodiments of this disclosure. Some or all of the illustrated components can be part of the computer system 900. For instance, the computer system 900 can be a general purpose computer (e.g., a laptop computer) or an embedded logic device (e.g., an FPGA), to name just two non-limiting examples. In some instances, the computer system 900 can be a computer tailored to a more specific role than a general purpose computer (e.g., the system-on-chip (SOC) for a mobile handset), which may be more tailored for mobile communications and low-power operation than a general purpose computer—although this is not necessarily the case.

Computer system 900 includes at least a processor 901 such as a central processing unit (CPU) or an FPGA to name two non-limiting examples. The query application server 308, the cache server 310, the query server 324, and the database server 320 in FIGS. 3-4 are just some components that could be implementations of the processor 901. The computer system 900 may also comprise a memory 903 and a storage 908, both communicating with each other, and with other components, via a bus 940. The bus 940 may also link a display 932, one or more input devices 933 (which may, for example, include a keypad, a keyboard, a mouse, a stylus, etc.), one or more output devices 934, one or more storage devices 935, and various non-transitory, tangible computer-readable storage media 936 with each other and with one or more of the processor 901, the memory 903, and the storage 908. All of these elements may interface directly or via one or more interfaces or adaptors to the bus 940. In one instance, the query device 304 can include an output device 934 such as a display for displaying the query application GUI 302. As another example, the various non-transitory, tangible computer-readable storage media 936 can interface with the bus 940 via storage medium interface 926. Computer system 900 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 901 (or central processing unit(s) (CPU(s))) optionally contains a cache memory unit 902 for temporary local storage of instructions, data, or computer addresses. Processor(s) 901 are configured to assist in execution of computer-readable instructions stored on at least one non-transitory, tangible computer-readable storage medium. Computer system 900 may provide functionality as a result of the processor(s) 901 executing software embodied in one or more non-transitory, tangible computer-readable storage media, such as memory 903, storage 908, storage devices 935, and/or storage medium 936 (e.g., read only memory (ROM)). For instance, the methods 500, 600, 700, and 800 in FIGS. 5-8 may be embodied in one or more non-transitory, tangible computer-readable storage media. The non-transitory, tangible computer-readable storage media may store software that implements particular embodiments, such as the methods 500, 600, 700, and 800, and processor(s) 901 may execute the software. Memory 903 may read the software from one or more other non-transitory, tangible computer-readable storage media (such as mass storage device(s) 935, 936) or from one or more other sources through a suitable interface, such as network interface 920. The query device 304 may include one or embodiments of the network interface 920 that can be used to pass query requests and receive query results from the query application server 308. The cache server 310 and the database server 320 may include one or more network interfaces configured to enable a WAN connection between these two components. The software may cause processor(s) 901 to carry out one or more processes or one or more steps of one or more processes described or illustrated herein. Carrying out such processes or steps may include defining data structures stored in memory 903 and modifying the data structures as directed by the software. In some embodiments, an FPGA can store instructions for carrying out functionality as described in this disclosure (e.g., the methods 500, 600, 700, and 800). In other embodiments, firmware includes instructions for carrying out functionality as described in this disclosure (e.g., the methods 500, 600, 700, and 800).

The memory 903 may include various components (e.g., non-transitory, tangible computer-readable storage media) including, but not limited to, a random access memory component (e.g., RAM 904) (e.g., a static RAM "SRAM", a dynamic RAM "DRAM, etc.), a read-only component (e.g., ROM 905), and any combinations thereof. ROM 905 may act to communicate data and instructions unidirectionally to processor(s) 901, and RAM 904 may act to communicate data and instructions bidirectionally with processor(s) 901. ROM 905 and RAM 904 may include any suitable non-transitory, tangible computer-readable storage media described below. In some instances, ROM 905 and RAM 904 include non-transitory, tangible computer-readable storage media for carrying out the methods 500, 600, 700, and 800. In one example, a basic input/output system 906 (BIOS), including basic routines that help to transfer information between elements within computer system 900, such as during start-up, may be stored in the memory 903. RAM 904 may be used to store network configuration settings for the LAN connection between the query application server 308 and the WAN connection between the cache server 310 and the database server 320. In other instances, RAM 904 may be used to store a query in the cache server 310 as the cache server 310 prepares to pass the query to the database server 320. These are just a few non-limiting examples of implementations of the RAM 904.

Fixed storage 908 is connected bidirectionally to processor(s) 901, optionally through storage control unit 907. Fixed storage 908 provides additional data storage capacity and may also include any suitable non-transitory, tangible computer-readable media described herein. Storage 908 may be used to store operating system 909, EXECs 910 (executables), data 911, API applications 912 (application programs), and the like. For instance, the storage 908 could be implemented for storage of query results in the cache 312 as described in FIGS. 3-4. Often, although not always, storage 908 is a secondary storage medium (such as a hard disk) that is slower than primary storage (e.g., memory 903). Storage 908 can also include an optical disk drive, a solid-state memory device (e.g., flash-based systems), or a combination of any of the above. Information in storage 908 may, in appropriate cases, be incorporated as virtual memory in memory 903. The cache 312 can utilize any one or more of the fixed storage 908, storage control unit 907, or memory 903, as well as other memory storage embodiments.

In one example, storage device(s) 935 may be removably interfaced with computer system 900 (e.g., via an external port connector (not shown)) via a storage device interface 925. Particularly, storage device(s) 935 and an associated machine-readable medium may provide nonvolatile and/or volatile storage of machine-readable instructions, data structures, program modules, and/or other data for the computer system 900. In one example, software may reside, completely or partially, within a machine-readable medium on storage device(s) 935. In another example, software may reside, completely or partially, within processor(s) 901.

Bus 940 connects a wide variety of subsystems. Herein, reference to a bus may encompass one or more digital signal lines serving a common function, where appropriate. Bus 940 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof. While only a single bus 940 is shown, in some embodiments, multiple buses may be used to couple various components in the computing system 900. For instance, the memory 903 may have a memory bus that splits off from and is distinct from a system bus.

Computer system 900 may also include an input device 933. In one example, a user of computer system 900 may enter commands and/or other information into computer system 900 via input device(s) 933. Examples of an input device(s) 933 include, but are not limited to, an alphanumeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 933 may be interfaced to bus 940 via any of a variety of input interfaces 923 (e.g., input interface 923) including, but not limited to, serial, parallel, game port, USB, FIREWIRE, THUNDERBOLT, or any combination of the above.

In particular embodiments, when computer system 900 is connected to network 930 (such as the LAN and WAN in FIGS. 3-4), computer system 900 may communicate with other devices, such as mobile devices and enterprise systems, connected to network 930. Communications to and from computer system 900 may be sent through network interface 920. For example, network interface 920 may receive incoming communications (such as requests or responses from other devices) in the form of one or more packets (such as Internet Protocol (IP) packets) from network 930, and computer system 900 may store the incoming communications in memory 903 for processing. Computer system 900 may similarly store outgoing communications (such as requests or responses to other devices) in the form of one or more packets in memory 903 and communicated to network 930 from network interface 920. Processor(s) 901 may access these communication packets stored in memory 903 for processing. For instance, the query server 324 may implement the processor 901 and receive packets from the cache server 310 containing a query and process this query in preparation for querying the database 322.

Examples of the network interface 920 include, but are not limited to, a network interface card, a modem, and any combination thereof. Examples of a network 930 or network segment 930 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. For instance, the WAN between the cache server 310 and the database server 320 is one exemplary implementation of the network 930. A network, such as network 930, may employ a wired and/or a wireless mode of communication. In general, any network topology may be used.

Information and data can be displayed through a display 932. Examples of a display 932 include, but are not limited to, a liquid crystal display (LCD), an organic liquid crystal display (OLED), a cathode ray tube (CRT), a plasma display, and any combinations thereof. The display 932 can interface to the processor(s) 901, memory 903, and fixed storage 908, as well as other devices, such as input device(s) 933, via the bus 940. The display 932 is linked to the bus 940 via a video interface 922, and transport of data between the display 932 and the bus 940 can be controlled via the graphics control 921. The query device 304 may include an implementation of the display 932 for assisting with interfacing with a user.

In addition to a display 932, computer system 900 may include one or more other peripheral output devices 934 including, but not limited to, an audio speaker, a printer, and any combinations thereof. Such peripheral output devices may be connected to the bus 940 via an output interface 924. Examples of an output interface 924 include, but are not limited to, a serial port, a parallel connection, a USB port, a FIREWIRE port, a THUNDERBOLT port, and any combinations thereof.

In addition or as an alternative, computer system 900 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. For instance, a non-transitory, tangible computer-readable medium may encompass one or more FPGAs, fixed logic, analogue logic, or some combination of the above. The present disclosure encompasses any suitable combination of hardware, software, or both.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Within this specification, the same reference characters are used to refer to terminals, signal lines, wires, etc. and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, or microcontroller. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., the methods 500, 600, 700, and 800) may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A database reporting system configured to communicate with a database via a cache server, the database reporting system comprising:
a cache server;
a query application server configured to couple to the cache server via a local area network, and configured to, after query results for a query cannot be found in the cache server, instruct the cache server to pass the query to a database server;
the database server hosted on one or more devices remote from the cache server and configured to couple to the cache server via a wide area network, and configured to receive the query from the cache server when the cache server returns a null to the query application server in response to query results for the query not being found in the cache server, the database server further configured to return the query results to the cache server, and wherein the query is in a first protocol, the database server comprising:
a database;
a query server, separate from the database, comprising a database-specific driver remote from the cache server, configured to receive the query from the cache server with lower latency than if the database-specific driver were arranged on the cache server, and configured to make the query to the database and receive the query results from the database, wherein the database-specific driver comprises one or more of software, hardware, and firmware adaptor module or modules that convert the query in the first protocol to a second protocol that is understood by the database, and wherein the second protocol is different from the first protocol, the query server configured to pass the query results back to the query application server via the cache server with lower latency than if the database-specific driver were arranged on the cache server, the query server further configured to directly cache the query results in the cache server; and
one or more wide area network connections configured for coupling to the cache server over the wide area network and configured to pass the query results from the query server to the cache server.

2. The database reporting system of claim 1, wherein the query server is further configured to instruct the cache server to cache one or more dependencies of the query results.

3. The database reporting system of claim 1, wherein the query device coupled to the query application server includes a graphical user interface for displaying the query results to a user.

4. A database reporting system configured to communicate with a database via a cache server, the database reporting system comprising:
a query application server configured to couple to a cache server and including a custom driver programmed to interface the query application server to the cache server, and configured to, after query results for a query cannot be found in the cache server, instruct the cache server to pass the query to a database server;
the database server hosted on one or more devices remote from the cache server and having:
a database;
a query server configured to receive the query from the cache server with lower latency than if the database-specific driver were arranged on the cache server;
a database-specific driver specific to the database and hosted on the query server;
a first network interface configured to enable a first remote connection between the database server and the cache server, the first network interface configured to receive queries in a first protocol from the cache server and to return query results directly to the cache server for caching, wherein the database-specific driver comprises one or more of software, hardware, and firmware adaptor module or modules that convert the queries in the first protocol to a second protocol that is understood by the database, and wherein the second protocol is different from the first protocol, and wherein the queries are received at the query application server and returned to the cache server with lower latency than a system where the database-specific driver is arranged on the cache server; and
a second network interface configured to enable a second remote connection between the database server and the query application server, the second network interface configured to return the query results to the query application server via the cache server.

5. The database reporting system of claim 4, wherein the query application server includes a cache server interfacing driver configured to interface with the cache server.

6. The database reporting system of claim 4, wherein the query application server is on a local area network, the local area network configured to include the cache server.

7. The database reporting system of claim 4, wherein the first remote connection includes a wide area network.

8. The database reporting system of claim 4, further comprising a query device coupled to the query application server and including a query application graphical user interface configured to present the query results to a user.

9. A method for operating a database reporting system, the method comprising:
    passing a query from a query application server to a REmote DIctionary Server cache server, wherein the query is in a first protocol;
    receiving, at the query application server, an indication that the REmote DIctionary Server cache server does not have a query result for the query;
    instructing, via the query application server, the REmote DIctionary Server cache server to pass the query to a query server of a database server, the REmote DIctionary Server cache server and the database server separated by a wide area connection, the query server hosting a database-specific driver, and the query server configured to receive the query from the REmote DIctionary Server cache server with lower latency than if the database-specific driver were arranged on the REmote DIctionary Server cache server, and;
    querying a database of the database server via the database-specific driver hosted on the query server, wherein the database-specific driver converts the query in the first protocol to a second protocol that is understood by the database, and wherein the second protocol is different from the first protocol;
    receiving a query result from the database; and
    passing the query result to the query application server via the wide area connection and the REmote DIctionary Server cache server with lower latency than if the database-specific driver were arranged on the REmote DIctionary Server cache server, and also caching the query result in the REmote DIctionary Server cache server.

10. The method of claim 9, wherein the querying is performed by the query server.

11. The method of claim 10, further comprising instructing the REmote DIctionary Server cache server to cache one or more dependencies of the query result.

12. The method of claim 11, wherein the one or more dependencies of the query result include a dependency of the query result to a table of the database.

13. The method of claim 11, further comprising monitoring the database for changes, independent from queries, in data and invalidating a cached search result, as soon as it becomes stale, in a cache of the REmote DIctionary Server cache server when the cached search result corresponds to or depends on the data that has changed in the database.

14. The method of claim 10, further comprising adding a cache server interfacing driver to the query application server without modifying an application layer of the query application server.

15. The method of claim 10, wherein caching functionality is enabled at a driver layer rather than an application layer.

16. The method of claim 10, wherein the query server passes the query result to the query application server via the wide area connection and a local area connection, the local area connection configured to couple the query application server and the REmote DIctionary Server cache server.

17. The database reporting system of claim 1, wherein the database-specific driver is not connected to the internet.

* * * * *